United States Patent [19]
Tanner et al.

[11] 4,339,142
[45] Jul. 13, 1982

[54] INNER TUBE TRACTION DEVICE

[76] Inventors: Douglas Tanner, c/o George Spector, 3615 Woolworth Bldg., 233 Broadway; George Spector, 3615 Woolworth Bldg., 233 Broadway, both of, New York, N.Y. 10007

[21] Appl. No.: 179,677

[22] Filed: Aug. 20, 1980

[51] Int. Cl.³ .............................................. B60S 9/00
[52] U.S. Cl. .................................... 280/759; 16/1 R; 296/37.6
[58] Field of Search ............... 280/759, 758; 296/37.6; 114/121; 256/1, 13.1, 64; 410/117, 118, 119; 16/1 R

[56] References Cited
U.S. PATENT DOCUMENTS

| | | | |
|---|---|---|---|
| 3,540,699 | 11/1970 | Guzzardella | 256/13.1 |
| 4,030,706 | 6/1977 | Ward | 256/1 |
| 4,138,095 | 2/1979 | Humphrey | 256/64 |
| 4,190,281 | 2/1980 | Chandler | 280/579 X |

FOREIGN PATENT DOCUMENTS 529669 of 1955 Italy ................................... 280/759

Primary Examiner—Andrew V. Kundrat

[57] ABSTRACT

A ballast designed particularly for carrying upon an automotive vehicle in an unobtrusive manner; the device including a flexible rubber tubing filled with a quantity of sand of known weight and the opposite ends of the tubing being tied or heat sealed in a closed position, and the weight of the ballast being imprinted on its outer side.

2 Claims, 5 Drawing Figures

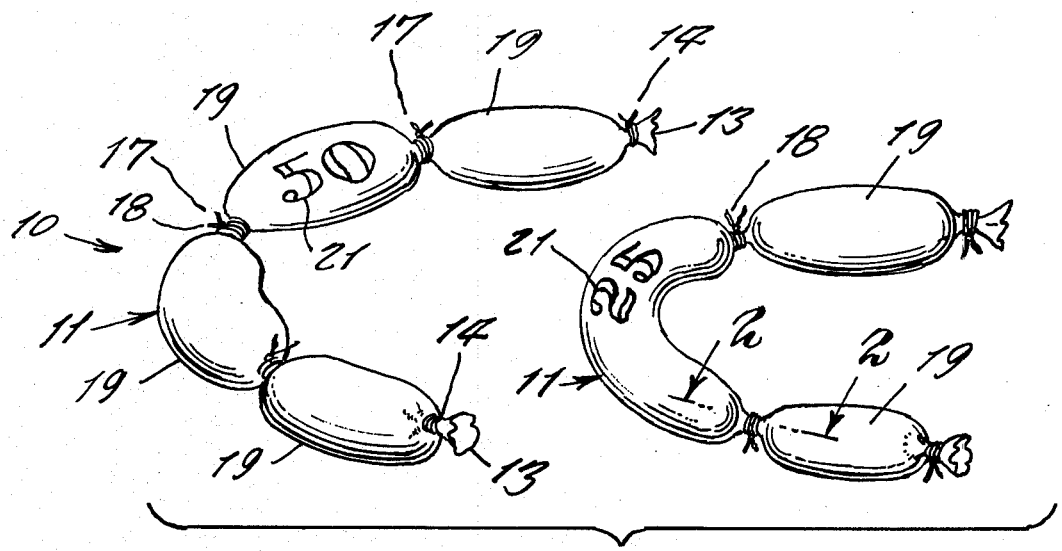
Fig. 1
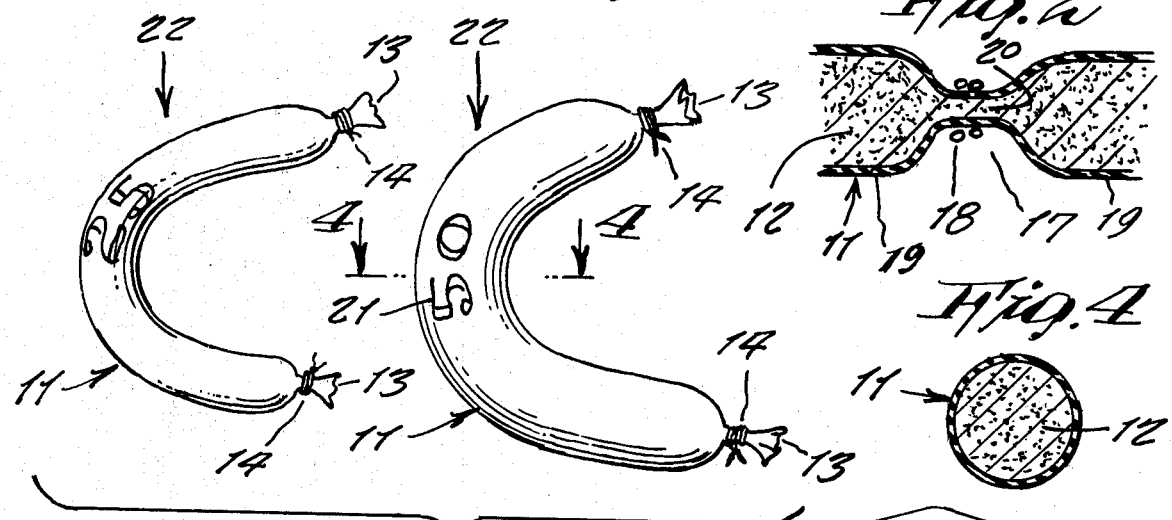
Fig. 2
Fig. 3
Fig. 4
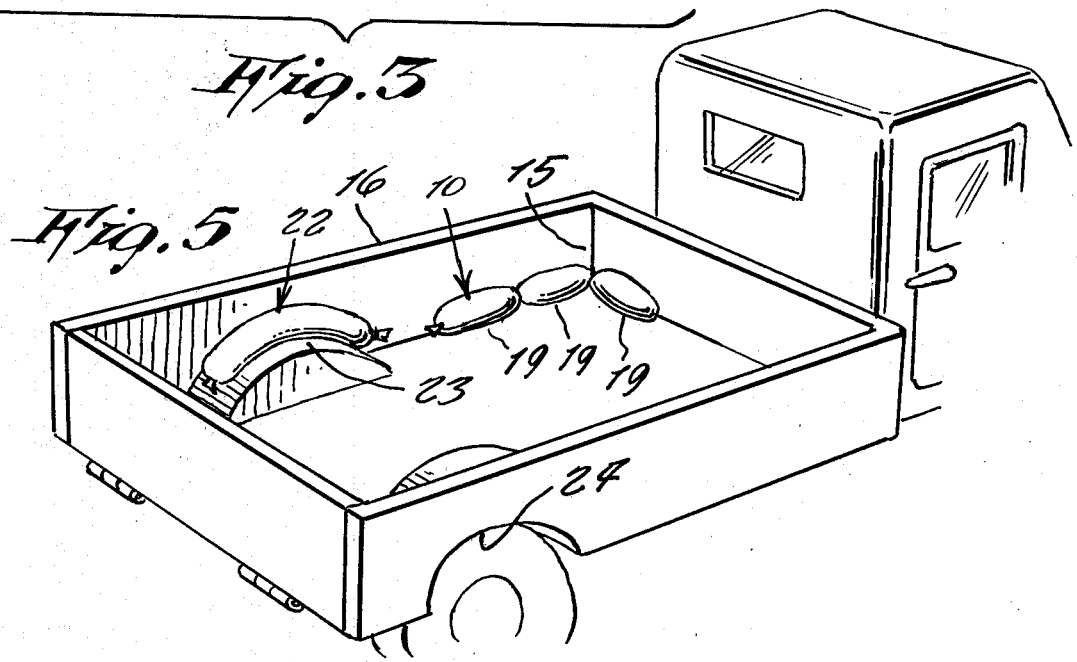
Fig. 5

INNER TUBE TRACTION DEVICE

This invention relates generally to automotive accessories.

It is well known to residents of colder climates that automotive vehicles do not get enough traction on a road surface that is covered by ice or snow, so that it is a common practice in wintertime to carry some heavy weight inside the trunk compartment over the rear wheels of most automobiles and also at a rear of lightweight trucks so that traction is achieved. Sometimes rocks or cement blocks are used for this purpose, but this is objectionable because these hard objects can damage other objects placed nearby by scratching them or denting them. The situation is accordingly in need of an improvement.

Therefore, it is a principal object of the present invention to provide a ballast weight for use in automotive vehicles, and which, while being heavy, has a resilient surface so that it will not damage other object nearby, and which accordingly will not injure a person's hands while being handled.

Another object is to provide a ballast weight which is designed for conveniently fitting into corners of a trunk compartment or truck bed, or which readily fits on top of a cowling of a wheel well where it is out of a way.

Still another object is to provide a ballast weight which can be made up in different weight sizes, and which is printed on its outer side with its total weight so as to aid a user in making a needed weight selection.

FIG. 1 is a perspective view of one design of the invention wherein the inner tube is constricted at several places so that the inner tube filled with sand, can be more easily bent at the constrictions so to fit more snug into corners, as shown in FIG. 5.

FIG. 2 is a cross sectional view on line 2—2 of FIG. 1.

FIG. 3 shows another design of the invention which does not include the constrictions.

FIG. 4 is a cross section on line 4—4 of FIG. 3.

FIG. 5 shows use of the inventions of FIGS. 1 and 2 at a corner of a pick-up truck bed and also on top of a wheel well cowling.

Referring now to the drawing in greater detail, and more particularly to FIGS. 1, 2 and 5 thereof at this time, the reference numeral 10 represents one design of ballast weight according to the present invention wherein the same is comprised of a length of flexible rubber tubing 11, inside of which a quantity of loose ordinary beach sand 12 is placed, and the opposite ends 13 of the tubing are then heat sealed or tied closed such as by a cord 14, so to prevent the sand from falling out. The tubing may be arcuate in longitudinal shape such as if it were a portion of an ordinary tire inner tube. By being arcuate, it will readily fit around other objects or tuck into corners such as a corner 15 of a pick up truck bed 16.

It is to be noted that a plurality of constrictions 17 are made along the length of the tubing by means of cords 18 wrapped therearound, so as to divide the tubing into links 19 so as to resemble generally a string of frankfurters. The constructions are not completely tight, as shown in FIG. 2, so that a narrow passage 20 exists between the links in order that sand from one link can be moved therethrough into an adjacent link, as wished, in order to selectively control a weight of any of the links as necessary.

A total weight of the ballast weight imprinted upon the outer side thereof is shown at 21.

The narrowness of the constrictions allows a greater flexibility at these points so that the entire ballast weight can be readily folded to any contour of space available for it.

In a modified design of the invention shows in FIGS. 3, 4 and 5 the ballast weight 22 is a same as ballast weight 10 except that it does not include the transverse constrictions that produce the row of links. As shows in FIG. 5, the ballast weight 22, readily fits to rest on top of a cowling 23 of a wheel well 24, so to apply weight where needed for wheel traction on a slippery surface.

What is claimed as new, is:

1. A ballast weight for an automotive vehicle comprising in combination, a flexible tubing, a quantity of sand inside said tubing, means for closing opposite ends of said tubing, and a plurality of narrow constrictions longitudinally spaced along said tubing dividing the same into a plurality of longitudinal links of different weight values including indicia for indicating the total weight of the ballast, said constrictions being formed of tightening means mounted about the tubing periphery which are tightened adjustably to provide constrictions of desired diameters which permit selective flow of sand between adjacent links to selectively adjust the weight of any link in the ballast and allow folding of the ballast to accommodate the available space contour.

2. A weight as in claim 1 wherein the tightening means is comprised of cords.

* * * * *